United States Patent
Mo et al.

(10) Patent No.: US 12,430,385 B2
(45) Date of Patent: Sep. 30, 2025

(54) METHODS, SYSTEMS, AND MEDIA FOR DISPLAYING STREAMING MEDIA CONTENT ON A USER DEVICE USING VIDEO SPRITE SHEETS

(71) Applicant: Google LLC, Mountain View, CA (US)

(72) Inventors: Vincent Mo, San Francisco, CA (US); Ariel Braunstein, San Francisco, CA (US); Austin Suszek, San Francisco, CA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 17/880,762

(22) Filed: Aug. 4, 2022

(65) Prior Publication Data
US 2024/0045903 A1    Feb. 8, 2024

(51) Int. Cl.
*G06F 16/74* (2019.01)
*G06F 3/0482* (2013.01)
*H04L 65/613* (2022.01)

(52) U.S. Cl.
CPC .......... *G06F 16/745* (2019.01); *G06F 3/0482* (2013.01); *H04L 65/613* (2022.05)

(58) Field of Classification Search
CPC .... G06F 16/745; G06F 3/0482; H04N 65/613
See application file for complete search history.

(56) References Cited

U.S. PATENT DOCUMENTS

| 5,754,770 A | * | 5/1998 | Shiels | A63F 13/47 348/E7.071 |
| 6,611,268 B1 | * | 8/2003 | Szeliski | G06T 7/215 348/700 |

(Continued)

OTHER PUBLICATIONS

International Preliminary Report on Patentability from International Application No. PCT/US2023/028935 dated Feb. 13, 2025, 12 pp.

(Continued)

*Primary Examiner* — Mishawn N. Hunter
(74) *Attorney, Agent, or Firm* — Shumaker & Sieffert, P.A.

(57) ABSTRACT

Methods, systems, and media for displaying streaming media content on a user device using video sprite sheets are provided. In some embodiments, a method for displaying streaming media content on a user device includes: receiving a first request to view media content through a media content streaming session in a user interface on a user device; transmitting, by the user device, a second request to a server that hosts the media content based on the first request to view the media content; receiving, at the user device, a response from the server, wherein the response comprises a video sprite sheet and the media content, wherein the video sprite sheet includes a plurality of video sprites in which each video sprite is selectable for rendering in portions of the user interface; determining that the media content streaming session contains a first reference to a first video sprite from the video sprite sheet, wherein the first reference is received by the user device and wherein the first reference further includes instructions to present the first video sprite concurrently with the media content; determining a location of the first video sprite within the video sprite sheet, wherein the location of the first video sprite comprises spatial coordinates of the first video sprite within the video sprite sheet and temporal coordinates of the first video sprite within the video sprite sheet; and causing the first video sprite to be presented concurrently with the media content in the user interface.

24 Claims, 5 Drawing Sheets

(56) References Cited

U.S. PATENT DOCUMENTS

| | | | |
|---|---|---|---|
| 6,919,892 B1* | 7/2005 | Cheiky | G06T 13/40 |
| | | | 348/E5.022 |
| 7,027,054 B1* | 4/2006 | Cheiky | H04N 5/262 |
| | | | 345/473 |
| 2010/0020068 A1* | 1/2010 | House | G06T 15/10 |
| | | | 345/419 |
| 2013/0102419 A1* | 4/2013 | Jeffery | A63B 24/0006 |
| | | | 473/409 |
| 2013/0296048 A1* | 11/2013 | Jeffery | A63F 13/92 |
| | | | 463/31 |
| 2016/0249085 A1* | 8/2016 | Ben-Atiya | H04N 21/85406 |
| 2016/0249108 A1 | 8/2016 | Sexton | |
| 2017/0111418 A1 | 4/2017 | Warren et al. | |
| 2019/0028758 A1 | 1/2019 | Talvensaari et al. | |
| 2021/0266354 A1 | 8/2021 | Shribman et al. | |
| 2022/0198368 A1* | 6/2022 | May | A63B 24/0003 |

OTHER PUBLICATIONS

International Search Report and Written Opinion of International Application No. PCT/US2023/028935 dated Nov. 30, 2023, 16 pp.
Lin, "Web-based sprite sheet animator for sharing programmatically usable animation metadata", Mar. 1, 2013, 67 pp.

* cited by examiner

METHODS, SYSTEMS, AND MEDIA FOR DISPLAYING STREAMING MEDIA CONTENT ON A USER DEVICE USING VIDEO SPRITE SHEETS

TECHNICAL FIELD

The disclosed subject matter relates to methods, systems, and media for displaying streaming media content on a user device using video sprite sheets.

BACKGROUND

Many forms of streaming exist today, which allows consumers to access large media content libraries, such as audio, video, and video game libraries. Streaming content works by establishing at least one streaming connection between the user device which displays the media content and a cloud service or server which hosts the media content. In many cases, the connection is only able to send media content over a single stream. As new streaming services are made available, there are instances where multiple smaller portions of media content are used in an application on the user device.

In one example, a user interface for a video streaming service may display movie titles that are available to stream to the user device in a grid, where each movie title is shown as an animated thumbnail of the movie trailer. In another example, a streaming video game title may provide user interface controls over the video game streaming connection. Video games often include static or rarely changing user interface elements, and including such user interface controls in the video game streaming connection only adds to the resources needed to stream the video game. In these illustrative examples, multiple streaming connections can be used, such as a separate stream for each animated thumbnail, or a separate video stream for each element of the video game controls. However, adding even a few additional streaming connections can quickly become resource intensive.

Accordingly, it is desirable to provide new methods, systems, and media for displaying streaming media content on a user device using video sprite sheets.

SUMMARY

In accordance with some embodiments of the disclosed subject matter, a method for displaying streaming media content on a user device is provided, the method comprising: receiving a first request to view media content through a media content streaming session in a user interface on a user device; transmitting, by the user device, a second request to a server that hosts the media content based on the first request to view the media content; receiving, at the user device, a response from the server, wherein the response comprises a video sprite sheet and the media content, wherein the video sprite sheet includes a plurality of video sprites in which each video sprite is selectable for rendering in portions of the user interface; determining that the media content streaming session contains a first reference to a first video sprite from the video sprite sheet, wherein the first reference is received by the user device and wherein the first reference further includes instructions to present the first video sprite concurrently with the media content; determining a location of the first video sprite within the video sprite sheet, wherein the location of the first video sprite comprises spatial coordinates of the first video sprite within the video sprite sheet and temporal coordinates of the first video sprite within the video sprite sheet; and causing the first video sprite to be presented concurrently with the media content in the user interface.

In some embodiments, receiving the response from the server that includes the video sprite sheet and the media content further comprises storing the video sprite sheet on the user device.

In some embodiments, receiving the response from the server that includes the video sprite sheet and the media content further comprises receiving a first media stream containing the video sprite sheet and receiving a second media stream containing the media content.

In some embodiments, the first video sprite comprises a selectable element of the user interface.

In some embodiments, the first media content comprises a video displayed in a video player of the user interface and the first video sprite comprises a layer of video to be presented concurrently with the first media content within the video player of the user interface.

In some embodiments, the first media content comprises a webpage and the first video sprite comprises an animated thumbnail.

In some embodiments, the instructions to present the first video sprite concurrently with the first media content comprises a position within the user interface and a duration for the first video sprite to be displayed at the position within the user interface.

In some embodiments, the method further comprises: determining that the media content streaming session contains a second reference to a second video sprite from the video sprite sheet, wherein the second reference is received by the user device and wherein the second reference further includes instructions to present the second video sprite concurrently with at least one of the first media content and the first video sprite; determining a location of the second video sprite within the video sprite sheet, wherein the location of the second video sprite comprises second spatial coordinates and second temporal coordinates; and causing the second video sprite to be presented concurrently with at least one of the first media content and the first video sprite in the user interface.

In accordance with some embodiments of the disclosed subject matter, a system for displaying streaming media content on a user device is provided, the system comprising: a memory; and a hardware processor that is configured to: receive a first request to view media content through a media content streaming session in a user interface on a user device; transmit, by the user device, a second request to a server that hosts the media content based on the first request to view the media content; receive, at the user device, a response from the server, wherein the response comprises a video sprite sheet and the media content, wherein the video sprite sheet includes a plurality of video sprites in which each video sprite is selectable for rendering in portions of the user interface; determine that the media content streaming session contains a first reference to a first video sprite from the video sprite sheet, wherein the first reference is received by the user device and wherein the first reference further includes instructions to present the first video sprite concurrently with the media content; determine a location of the first video sprite within the video sprite sheet, wherein the location of the first video sprite comprises spatial coordinates of the first video sprite within the video sprite sheet and temporal coordinates of the first video sprite within the video sprite sheet; and cause the first video sprite to be presented concurrently with the media content in the user interface.

In accordance with some embodiments of the disclosed subject matter, a non-transitory computer-readable medium containing computer executable instructions that, when executed by a processor, cause the processor to execute a method for displaying streaming media content on a user device is provided, the method comprising: receiving a first request to view media content through a media content streaming session in a user interface on a user device; transmitting, by the user device, a second request to a server that hosts the media content based on the first request to view the media content; receiving, at the user device, a response from the server, wherein the response comprises a video sprite sheet and the media content, wherein the video sprite sheet includes a plurality of video sprites in which each video sprite is selectable for rendering in portions of the user interface; determining that the media content streaming session contains a first reference to a first video sprite from the video sprite sheet, wherein the first reference is received by the user device and wherein the first reference further includes instructions to present the first video sprite concurrently with the media content; determining a location of the first video sprite within the video sprite sheet, wherein the location of the first video sprite comprises spatial coordinates of the first video sprite within the video sprite sheet and temporal coordinates of the first video sprite within the video sprite sheet; and causing the first video sprite to be presented concurrently with the media content in the user interface.

In accordance with some embodiments of the disclosed subject matter, a system for displaying streaming media content on a user device is provided, the system comprising: means for receiving a first request to view media content through a media content streaming session in a user interface on a user device; means for transmitting, by the user device, a second request to a server that hosts the media content based on the first request to view the media content; means for receiving, at the user device, a response from the server, wherein the response comprises a video sprite sheet and the media content, wherein the video sprite sheet includes a plurality of video sprites in which each video sprite is selectable for rendering in portions of the user interface; means for determining that the media content streaming session contains a first reference to a first video sprite from the video sprite sheet, wherein the first reference is received by the user device and wherein the first reference further includes instructions to present the first video sprite concurrently with the media content; means for determining a location of the first video sprite within the video sprite sheet, wherein the location of the first video sprite comprises spatial coordinates of the first video sprite within the video sprite sheet and temporal coordinates of the first video sprite within the video sprite sheet; and means for causing the first video sprite to be presented concurrently with the media content in the user interface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
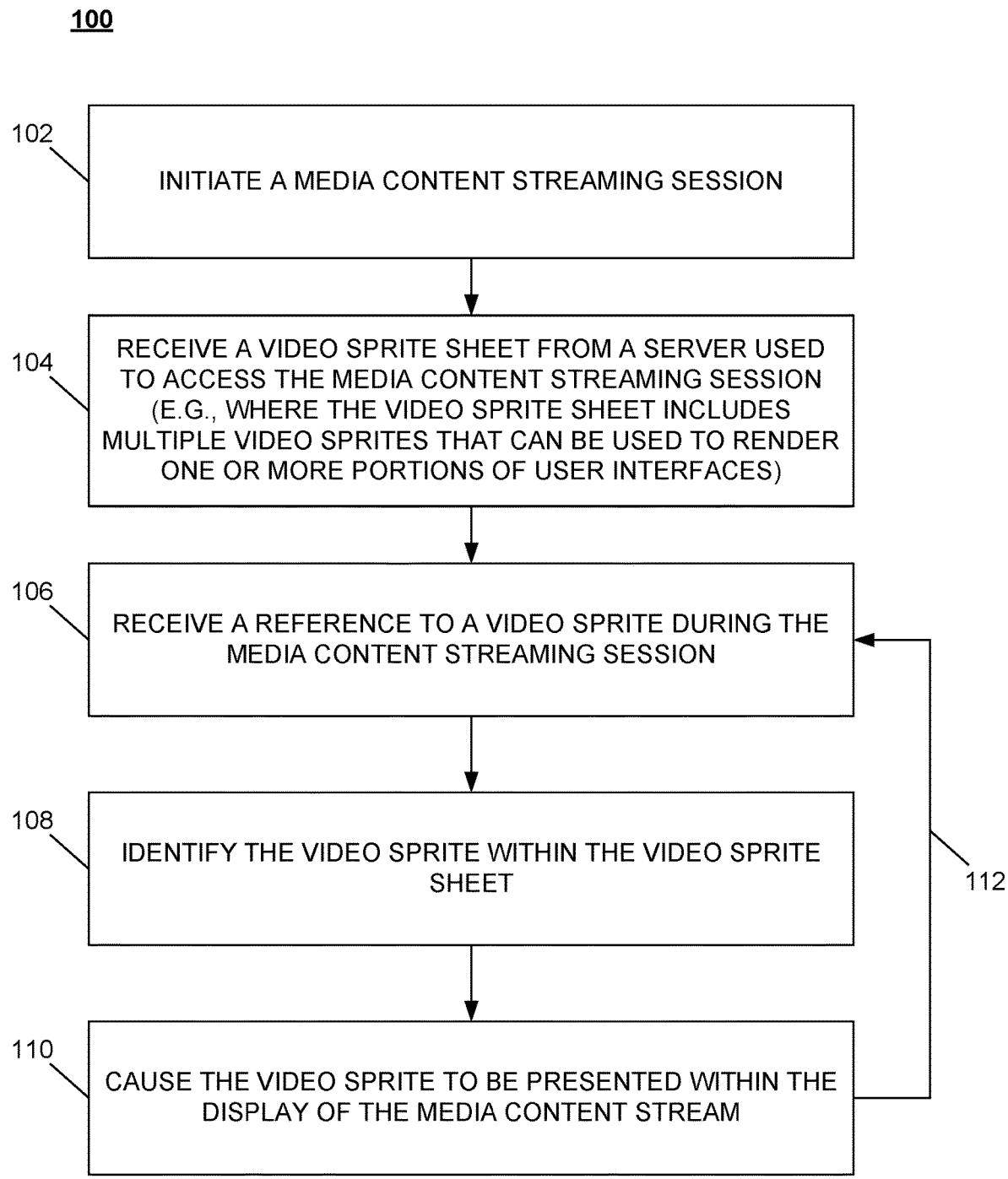
FIG. 1 shows an example flow diagram of an illustrative process for displaying streaming media content on a user device using video sprite sheets in accordance with some embodiments of the disclosed subject matter.

In accordance with various embodiments of the disclosed subject matter, mechanisms (which can include methods, systems, and media) for displaying streaming media content on a user device are provided.

Generally speaking, the mechanisms described herein relate to the generation and use of video sprite sheets that includes multiple video sprites that each include content for rendering in a portion of a user interface. Video sprite sheets can, in some embodiments, be streamed alongside a media content stream, which can include a video content item. In some embodiments, the video sprite sheet can be downloaded at the start of a streaming session, where that video sprite sheet is then referenced throughout the media content queued for streaming. In some embodiments, the streaming session can send references to the video sprite sheet, and in particular, to individual video sprites contained within the video sprite sheet. The user device receiving the media content can then extract the video sprites from the video sprite sheet, where content within the extract video sprite can be rendered in a portion of a user interface (e.g., while the user interface is concurrently presenting the media content).

Another aspect related to the use of a video sprite sheet includes how individual video sprites can be arranged to form the video sprite sheet. Video content can contain three dimensions—e.g., two spatial dimensions and one temporal dimension. A video sprite can occupy a region of pixels within a video frame and/or several video frames. In this way, several video sprites can be arranged into pixel regions to form the video frame. To extract the video sprite, the video sprite sheet can be sliced regionally. For example, a video sprite sheet can contain four video sprites, each with a letter (e.g., A, B, C, and D) rotating clockwise. Each video sprite can be arranged uniformly to occupy one quadrant of the video frames, where each of the four video sprites can have the same duration. When a media content stream sends a reference to the video sprite containing the letter A rotating clockwise, the video sprite sheet can be region sliced. In some embodiments, when this video sprite sheet is being streamed to the user device, the letter A video sprite can be updated to rotate counter-clockwise.

Additionally, a video sprite can occupy the entire region of a video frame and can extend through a subset of frames of the video sprite sheet. In this way, several video sprites can be arranged in sequential order to form the full duration of the video sprite sheet. To extract the video sprite, the video sprite sheet can be sliced temporally. For example, the video sprite sheet that contains four video sprites, each with a letter (e.g., A, B, C, and D) rotating clockwise, can be arranged so that each video sprite occupies a four-second duration within the video sprite sheet. Specifically, the "A" video sprite can occupy seconds 0 through 4 of the video sprite sheet, the "B" video sprite can occupy seconds 4 through 8, the "C" video sprite can occupy seconds 8 through 12, and the "D" video sprite can occupy seconds 12 through 16. When the video sprite containing "A" is referenced, the first four seconds of the video sprite sheet can be presented on a loop.

In some implementations, slicing in both dimensions can be used. For example, a series of video sprites with the same duration can be arranged within different regions of the video frame. Then, to extract one of the video sprites, regional slicing and temporal slicing can be performed.

In some embodiments, video sprites and video sprite sheets can be deployed in a streaming environment where several streams, some containing static content, can be replaced with the video sprite sheet and one remaining media content stream. In some embodiments, the streaming environment can reference the video sprite sheet. In some embodiments, the reference to the video sprite sheet can contain information on what portion(s) of the video sprite sheet to slice (e.g., region and/or temporal as discussed above) and also when and where to display the video sprite sheet in the media content. In some embodiments, the user device receiving the media content stream can process the reference to the video sprite sheet by performing the region and/or time slicing, and by causing the video sprite extracted from the video sprite sheet to be displayed concurrently with the media content.

It should be noted that, in some embodiments, the media being streamed can employ multiple video sprites from the same video sprite sheet.

Turning to FIG. 1, an example flow diagram of an illustrative process 100 for displaying streaming media content on a user device in accordance with some embodiments of the disclosed subject matter is shown. In some embodiments, process 100 can run on a server, such as server 402, and/or a user device, such as user devices 406, described below in connection with FIG. 4. In some embodiments, process 100 can make use of communication networks, such as communication network 404.

In some embodiments, process 100 can begin at 102 when a user of a user device initiates a media content streaming session. For example, the user device can initiate a media content streaming session when the user executes any suitable application on the user device that connects to a video streaming service, a music streaming service, a video game streaming service, and/or any other suitable type of streaming service. In another example, in some embodiments, the user can select a media content item to view on the user device, which can cause the user device to initiate the media content streaming session. In some embodiments, any suitable user interface can be presented in connection with the media content streaming session. For example, in some embodiments, the user device can execute an application provided by a streaming service in which a user of the user device can select a content item from a presented user interface in the application. In another example, such as a video game streaming service, in some embodiments, the user interface can include a first type of user interface element that is displayed upon executing the application (e.g., a gaming application) and a second type of user interface element that is enabled and/or updated upon initiating the media content streaming session and/or at other blocks of process 100.

In some embodiments, the user device can receive a request from any suitable source. For example, in some embodiments, as part of presenting a webpage and/or application, the user device can receive a request from the webpage and/or application to load an advertisement from an advertising content distribution server. In another example, in some embodiments, the user device can determine that the user device has finished presenting a media content item and that a next media content item is available for playback, such as a playlist within a streaming service.

In some embodiments, the media content streaming session can be configured to stream any suitable type of media content, such as video content, video thumbnails, audio content, video game content, advertisements, animated icons, live video, etc.

In some embodiments, the user device can send a request to a server that hosts the media content. For example, in some embodiments, the user device can use communication link(s) 412 and communication network 404 to communicate with any suitable server and/or streaming service. In some embodiments, the user device can send any suitable information in the request to the server. For example, in some embodiments, any suitable account information (e.g., a profile and/or an account associated with the streaming service) can be included in the request. In another example, in some embodiments, information identifying the requested media (e.g., media identifier, media display name, media production channel, etc.) can be included in the request. In yet another example, in some embodiments, the request to the server can be based on information contained in the received request for media content at the user device.

In some embodiments, process 100 can continue to block 104 when a media content streaming session begins on the user device. In some embodiments, the user device can receive a response from a streaming server to the request at 102 to initiate a media content streaming session. In some embodiments, the response can contain any suitable information regarding the media content streaming session. For example, in some embodiments, the response can include a session and/or stream identifier, information on available resolutions for the media content requested by the user device, information on the streaming and/or connection quality, etc.

In some embodiments, at 104, the user device can begin receiving the media content in a media stream. In some embodiments, the media stream can be received in one or more streaming connections at any suitable bitrate and using any suitable network protocol. In some embodiments, the media stream can include a video stream encoded using any suitable video encoding format. In some embodiments, the media stream can include an audio stream encoded using any suitable audio encoding format.

In some embodiments, the media stream can include a media content item, such as a video. In some embodiments, the media stream can include a video sprite sheet, as described in FIG. 2. In some embodiments, the user device can download the video sprite sheet from the media stream, where the video sprite sheet can be stored on the user device.

Figure 2:
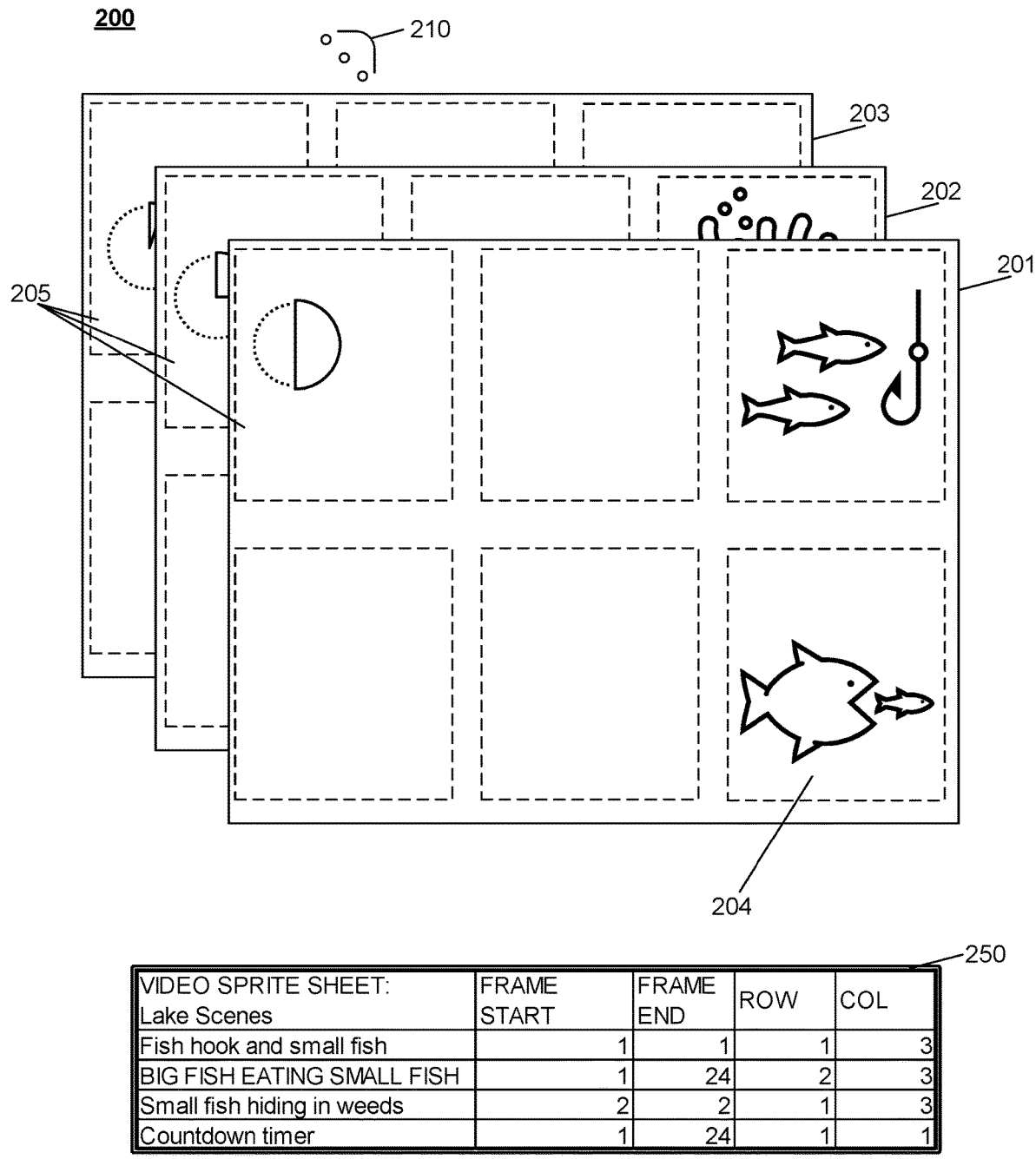
FIG. 2 shows an illustrative example of a video sprite sheet in accordance with some embodiments of the disclosed subject matter.

Turning to FIG. 2, an illustrative example 200 of a video sprite sheet in accordance with some embodiments of the disclosed subject matter is shown. As illustrated, video sprite sheet 200 can include video frames 201-203, video sprites 204 and 205, additional frames 210, and sprite location data 250.

It should be noted that, in some embodiments, video sprite sheet 200 can include video content that is any suitable size, resolution, duration, number of frames, etc.

In some embodiments, sprite location data 250 can include information on video sprites contained within video sprite sheet 200. For example, in some embodiments, sprite location data 250 can be included in the metadata of video sprite sheet 200. In some embodiments, sprite location data 250 can include look-up tables, database references, a manifest file, and/or any other suitable mechanism that identifies individual video sprites in video sprite sheet 200. In some embodiments, individual video sprites can be identified by coordinates that denote the spatial location of the video sprite and the temporal location of the video sprite. For example, as shown in sprite location data 250, video sprite sheet 200 can include values for the spatial extent ("ROW" and "COL") and temporal extent ("FRAME START" and "FRAME END") of each individual video sprite ("fish hook and small fish," etc.) contained in video sprite sheet 200.

In some embodiments, a video sprite can be located at any suitable spatial coordinates of video sprite sheet 200. In some embodiments, a video sprite can be located at any suitable temporal coordinates. For example, in some embodiments, video sprite 204 can be a two-second clip (e.g., to be played back at 12 frames per second) that is stored in the lower right hand corner of frames 1 through 24 of video sprite sheet 200. In another example, in some embodiments, a video sprite can be located at any suitable frame and have any suitable duration within video sprite sheet 200. As shown in FIG. 2, video sprite 205 can be located in an upper left-hand corner and can have a duration of twenty-four frames, while three frames are shown in FIG. 2.

In some embodiments, spatial coordinates can refer to a pixel, series and/or region of pixels that contains imagery used in a video sprite. In some embodiments, spatial coordinates can be absolute pixel values and/or relative pixel values (e.g., references to an image or series of images based on a row and column value pair). As shown in FIG. 2, sprite location data 250 can store the row number and column number for each video sprite, where each video sprite can have the same rectangular boundary (shown in dashed lines within frames 201, 202, and 203). In some embodiments, temporal coordinates can refer to a frame, series, and/or duration of frames that contains imagery used in a video sprite. In some embodiments, temporal coordinates can be a frame number, a time stamp, and/or any other suitable indicator of time within video sprite sheet 200. As shown in FIG. 2, sprite location data 250 can store the starting frame and ending frame for each video sprite in video sprite sheet 200. In some embodiments, spatial coordinates and temporal coordinates for each individual video sprite can be stored in the metadata, database reference, manifest file, and/or any other suitable mechanism that identifies individual video sprites in video sprite sheet 200.

In some embodiments, video sprites within video sprite sheet 200 can have a fixed size (e.g., 128 pixels by 128 pixels). For example, in some embodiments, video sprites can be uniformly arranged in rows and columns, and an individual video sprite can be referenced by a row number and column number. In some embodiments, video sprites within video sprite sheet 200 can occupy the full frame extent of the video sprite sheet. That is, in some embodiments, an individual video sprite can have spatial coordinates that match the pixel width and height of video sprite sheet 200.

In some embodiments, video sprites within video sprite sheet 200 can have varying size (e.g., some sprites are square, others are rectangular). For example, in some embodiments, an individual video sprite can be placed in any suitable location and can be referenced by the pixel values denoting the edges of the individual video sprite (e.g., a starting corner and ending opposite corner, a starting pixel and a width and/or height to include beyond the starting pixel, etc.).

In some embodiments, video sprites within video sprite sheet 200 can extend through multiple frames of video sprite sheet 200. For example, an individual video sprite can include varying imagery within the same spatial region across multiple frames. For example, as shown in sprite location information 250, video sprite 205 can have a duration of twenty-four frames, and can include a different image in the same spatial coordinates at each frame. As shown in FIG. 2, video sprite 205 is a countdown timer with an advancing watch hand (counterclockwise to count down) in each successive frame of frames 201, 202, and 203. For example, the watch hand can show thirty seconds remaining in frame 201. Continuing this example, video sprite 205 can show fifteen seconds remaining in frame 202 and five seconds remaining in frame 203. In some embodiments, video sprite sheet 200 shown in FIG. 2 can contain additional frames 210 beyond what is shown in FIG. 2., and video sprite 205 can extend into the additional frames 210.

In some embodiments, video sprites within video sprite sheet 200 can have a fixed duration. For example, similar to the example of video sprites having a fixed spatial size, the individual video sprites can have the same duration (e.g., one second, five seconds, twenty-four frames, etc.). In this example, in some embodiments, the temporal coordinates of an individual video sprite can be referenced by a group number (similar to the row number and column number of the spatial dimension). As a specific example, when all of the video sprites in video sprite sheet 200 have a duration of five seconds, an individual video sprite can be referenced as having a temporal coordinate in the second (2nd) group, corresponding to starting and ending timestamps of five seconds (00:00:05) and ten seconds (00:00:10), respectively, in video sprite sheet 200.

In some embodiments, video sprites within video sprite sheet 200 can have a varying duration. For example, the individual sprites can each have a different starting time, ending time, duration, etc. In some embodiments, the temporal coordinate of an individual sprite can be referenced by the temporal boundaries of the video sprite. For example, in some embodiments, the video sprite can be referenced by a starting frame number and an ending frame number, by a starting frame number and a duration of frames, by a starting timestamp and an ending timestamp, by a starting timestamp and a duration of time, and/or any other suitable time reference.

Referring back to FIG. 1, in some embodiments, at 106, process 100 can receive a reference to a video sprite during the media content streaming session. For example, in some embodiments, the user device can receive a reference from the server as part of the media stream that delivers media content in the media content streaming session.

In some embodiments, the user device can use the reference received at 106 to identify a file, web location, additional media stream, and/or any other suitable pointer to a video sprite sheet that contains the corresponding video sprite. In some embodiments, the reference can include the size (e.g., pixel width and/or height) of the video sprite, a desired resolution of the video sprite, a current resolution of the media stream and instructions to provide the video sprite at a resolution that matches the current resolution.

In some embodiments, the reference received at 106 can include instructions for a location to display the video sprite in relation to the media content. For example, in some embodiments, the reference can include pixel locations (e.g., starting and ending pixel values) to display the video sprite. In another example, in some embodiments, the reference can include relative locations to display the video sprite. Continuing this example, the video sprite can be an element of a user interface (e.g., control stick, selectable icon, etc.), and the reference can include instructions to display the video sprite in relation to a static and/or dynamic element of the user interface that is contained in the media content stream (e.g., a dialog box).

In some embodiments, the reference received at 106 can include instructions for a duration of playback of the media content to display the video sprite. For example, in some embodiments, the instructions can indicate that the video sprite can loop any suitable number of times. In another example, in some embodiments, the video sprite can be displayed at a frame rate different than the frame rate of the media content. Continuing this example, the video sprite can have a duration of three frames that, when displayed in the video sprite sheet, are displayed for one second each. Continuing this example, the reference to this video sprite can include instructions to display the first frame for a first duration of time (e.g., ten milliseconds), the second frame for a second duration of time (e.g., fifteen milliseconds), and the third frame for a third duration of time (e.g., twenty milliseconds). In some embodiments, the duration to display the video sprite can be the remaining duration of the media content item. In some embodiments, the duration to display the video sprite can be relative. For example, in some embodiments, the reference can include instructions to display the video sprite while any other suitable condition is met (e.g., while the media content is being displayed, while a particular feature within the media content is being displayed, for the duration of any suitable portion of the media content such as a chapter duration, etc.). As a more particular example, in some embodiments, the video sprite can be a selectable user interface element, and the reference can include instructions to display the video sprite until a user has selected the user interface element, and/or any other user interface element.

In some embodiments, the reference received at 106 can include instructions for a starting time to display the video sprite. For example, in some embodiments, the user device can receive the reference to the video sprite, at a particular amount of time prior to the starting time that the video sprite is to be displayed, to perform any suitable lookup, search, retrieval, fetch, and/or buffer tasks associated with using the video sprite from the video sprite sheet, as discussed in the blocks below. That is, in some embodiments, the reference can be received with any suitable amount of time between when the user device receives the reference and when the instructions indicate the display of the video sprite can start.

In some embodiments, the reference received at 106 can include instructions to display the video sprite in a particular layer relative to the media content. For example, the video sprite can be a gently moving landscape (e.g., a sunset, trees blowing in the wind, etc.) and the reference can include instructions to display the video sprite beneath the media content.

In some embodiments, the reference received at 106 can include multiple references to multiple video sprites. For example, in some embodiments, the reference received at 106 can include a list of all references to video sprites that are required for the duration of the media content stream. That is, in some embodiments, the user device can receive a single reference at the beginning of the media content streaming session which contains all video sprite references. In another example, in some embodiments, the reference received at 106 can include multiple references to the same video sprite. For example, in some embodiments, a particular video sprite can be referenced a first time at a beginning portion of media content (e.g., a video sprite used as a background for an intro to an educational video) and can be referenced a second time at an ending portion of media content (e.g., the same video sprite is used again as a background during the outro of the educational video). In this example, in some embodiments, the first time and the second time of the media content can be included within the same reference to the video sprite.

In some embodiments, the reference received at 106 can include instructions to display the video sprite such that other portions of the media content are inhibited. For example, in some embodiments, the video sprite can be displayed as a video texture of a user interface element. In another example, in some embodiments, the video sprite can be displayed at a layer on top of other user interface and/or media content layers. In some embodiments, the reference received at 106 can include a transparency value to be used in the display of the video sprite, such that other portions of the media content are only partially inhibited.

In some embodiments, at 108, process 100 can identify the video sprite contained within the video sprite sheet. For example, in some embodiments, the user device can, at 108, open the video sprite sheet indicated by a filename, file path, and/or stream identifier contained in the reference received at 106. In some embodiments, at 108, the user device can extract the video sprite from the video sprite sheet. In some embodiments, at 108, process 100 can snip a portion of the video data of the video sprite sheet, using pixel values and frame numbers contained in the reference received at 106.

In some embodiments, at 108, process 100 can identify multiple video sprites from the same video sprite sheet. For example, in some embodiments, the reference received at 106 can contain multiple references to video sprites within the same video sprite sheet. In this example, in some embodiments, process 100 can identify each video sprite sheet, using any suitable mechanism.

In some embodiments, the user device can create a new video file at 108 in connection with identifying the video sprite. For example, the video sprite sheet can be stored locally on the user device in memory and/or storage 504, and process 100 can create a stand-alone video file containing the portions of the video sprite sheet (e.g., frames and/or portions of frames) in which the video sprite is contained. In another example, process 100 can create a copy of the video sprite sheet including any additional features, such as a mask, over the regions that are not related to the video sprite. In another example, process 100 can create an image file that, when viewed concurrently with the video sprite sheet, masks regions of the video sprite sheet that are not related to the video sprite.

Figure 3:
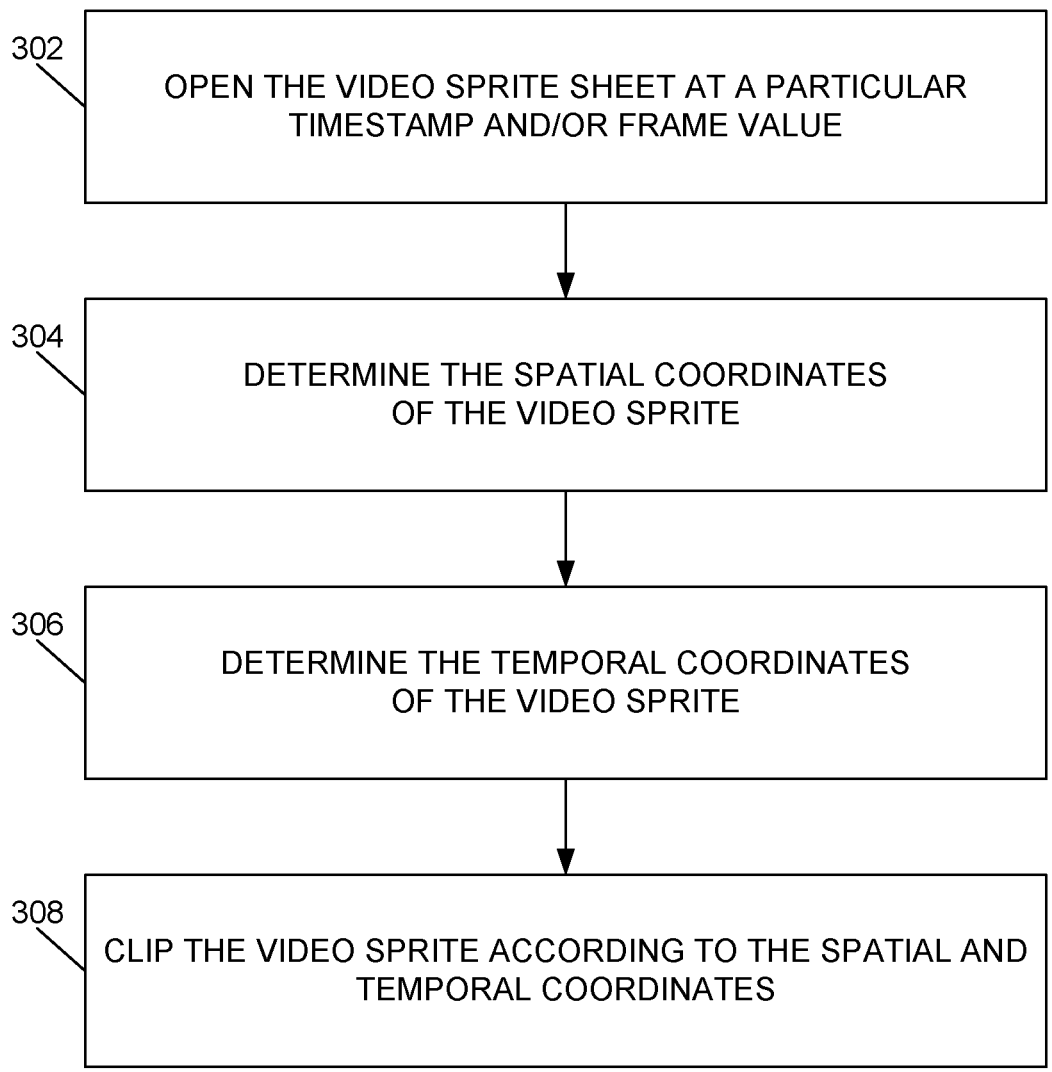
FIG. 3 shows an example flow diagram of an illustrative process for identifying a video sprite contained within a video sprite sheet in accordance with some embodiments of the disclosed subject matter.

In some embodiments, the user device can use any suitable mechanism to identify and/or extract the video sprite within the video sprite sheet at 108, for example process 300 described in FIG. 3.

Turning to FIG. 3, an example flow diagram of an illustrative process for identifying a video sprite contained within a video sprite sheet in accordance with some embodiments of the disclosed subject matter is shown. In some embodiments, process 300 can run as a sub-process of any suitable process used to display streaming media content, such as process 100. In some embodiments, process 300 can be used by a user device.

In some embodiments, process 300 can begin at 302 when process 300 receives any suitable information containing a reference to a video sprite, video sprite sheet, and/or any other suitable information. For example, in some embodiments, process 300 can receive any suitable information determined, received, and/or identified at blocks 102, 104, and 106 of process 100 as described above.

In some embodiments, at 302, process 300 can open a video sprite sheet. For example, in some embodiments, process 300 can use a particular filename, file path, streaming session identifier, universal resource locator, and/or any other suitable reference to the video sprite sheet, to identify the location of the video sprite sheet. In some embodiments, at 302, process 300 can open the video sprite sheet at the identified location using any suitable video editing application. For example, in some embodiments, process 300 can use a video editing tool which does not have a corresponding user interface. In another example, in some embodiments, process 300 can use any suitable virtual environment to open and manipulate the video sprite sheet. In some embodiments, at 302, process 300 can open and/or advance the video sprite sheet to any suitable timestamp and/or frame value that contains the video sprite, for example, a starting time stamp contained in a reference to the video sprite.

In some embodiments, at 304, process 300 can determine the spatial coordinates of the video sprite. For example, in some embodiments, at 304 process 300 can determine a shape boundary that defines the extent of the video sprite in the current frame. In some embodiments, process 300 can use pixel values from any suitable source, such as a reference to the video sprite at block 106. In some embodiments, process 300 can use any suitable additional information to determine the spatial coordinates. In some embodiments, process 300 can use a manifest file, directory, metadata, and/or any other suitable file and/or information included with the video sprite sheet to identify spatial coordinates of the video sprite. For example, in some embodiments, the video sprites can be arranged uniformly in rows and columns within the video sprite sheet. Continuing this example, if process 300 receives a reference to a row and column pair of values, then at 304, process 300 can reference metadata of the video sprite sheet to identify the size (in pixels) of the video frames and can convert the row and column values to pixels.

In some embodiments, at 306, process 300 can determine the temporal coordinates of the video sprite. For example, in some embodiments, at 306 process 300 can determine a temporal boundary that defines the number of frames and/or duration of time of the video sprite. In some embodiments, process 300 can use frame values and/or timestamps from any suitable source, such as a reference to the video sprite at block 106. In some embodiments, process 300 can use any suitable additional information to determine the temporal coordinates. In some embodiments, process 300 can use a manifest file, directory, metadata, and/or any other suitable file and/or information included with the video sprite sheet to identify temporal coordinates of the video sprite. For example, in some embodiments, the video sprites can be arranged uniformly in groups of time with the same duration. Continuing this example, if process 300 receives a reference to a particular sprite group, then at 304, process 300 can reference metadata of the video sprite sheet to identify and convert the group value into the frames, timestamps, etc. through which the video sprite extends.

In some embodiments, at 308, process 300 can clip the video sprite from the video sprite sheet using any suitable mechanism. For example, in some embodiments, process 300 can create a new video file containing the video data corresponding to the spatial and temporal coordinates determined at blocks 304 and 306 that define the video sprite. In another example, in some embodiments, process 300 can create a mask that, upon playback of the video sprite sheet, inhibits the presentation of the portions (spatial and temporally) of the video sprite sheet that are not included in the video sprite.

Figure 5:
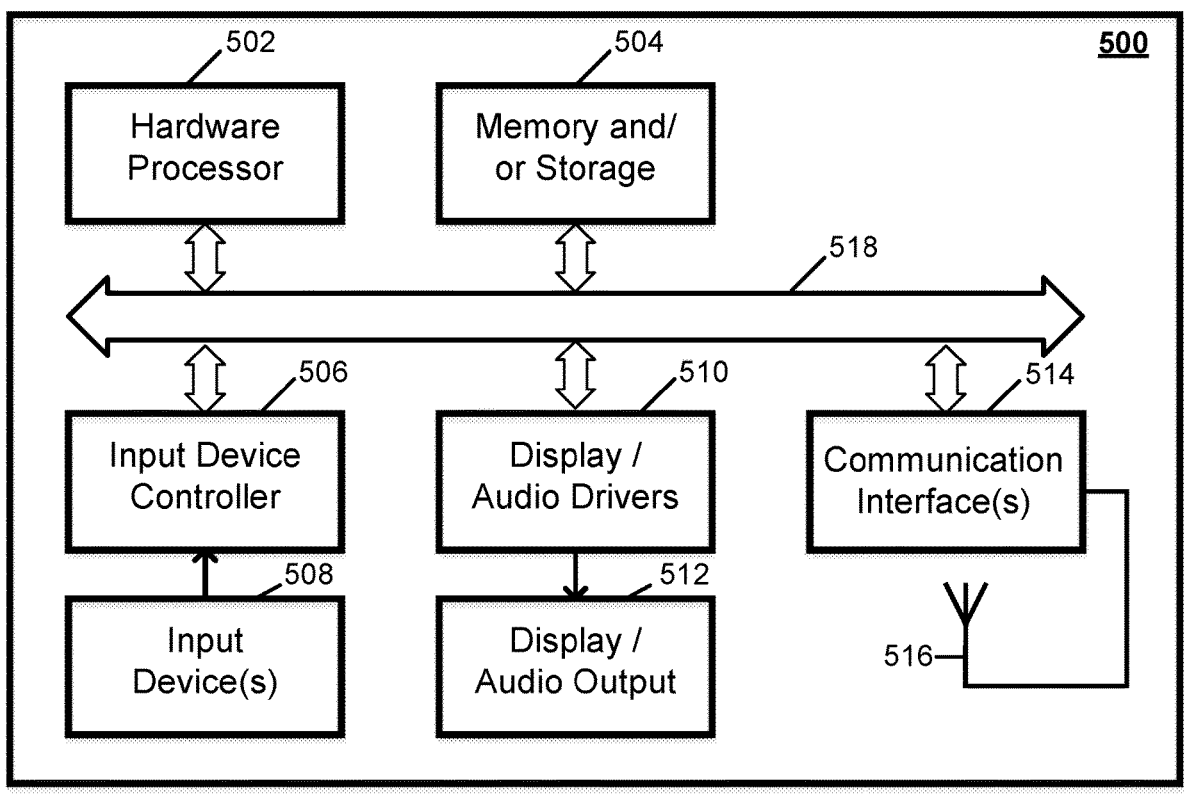
FIG. 5 shows an example block diagram of hardware that can be used in a server and/or a user device of FIG. 4 in accordance with some embodiments of the disclosed subject matter.

Referring back to FIG. 1, at 110 process 100 can cause the video sprite to be presented concurrently with media content in the display of the media content stream in some embodiments. In some embodiments, process 100 can determine that the media content stream has reached a frame value and/or timestamp that matches the reference received at 106 and can cause the video sprite to be displayed at a spatial location of the media content, where the spatial location is contained in the reference received at 106. For example, in some embodiments, process 100 can use display/audio driver 510 to cause the concurrent presentation of the media content and the video sprite on display/output 512, as discussed below in FIG. 5.

In some embodiments, at 110, process 100 can cause multiple video sprites to be presented concurrently with media content in the display of the media content stream in some embodiments. For example, in some embodiments, the reference received at 106 can contain multiple references to video sprites within the same video sprite sheet, and at 110, process 100 can display each video sprite at the time indicated in the reference received at 106.

In some embodiments, at 110, process 100 can apply any suitable transparency value to the video sprite, as indicated by the reference received at 106. In some embodiments, at 110, process 100 can cause the video sprite to be displayed at any suitable layer relative to layers within the video data of the media content.

In some embodiments, at 110, process 100 can perform any suitable quality control on the video sprite before displaying the video sprite. For example, in some embodiments, process 100 can determine a spatial resolution of the video sprite and can compare the spatial resolution to the resolution of the media content. As a numeric example, in some embodiments, media content can be streamed to the user device at a resolution of 1080p (e.g., Full HD), and process 100 can determine that the resolution of the video sprite is 4K or 2160p (e.g., Ultra HD), a higher resolution than 1080p. In this example, process 100 can perform any suitable down-sampling so that the video sprite, when displayed in the media content, is displayed at a resolution of 1080p.

In some embodiments, at 110, process 100 can check outer pixels and/or outer frames of the video sprite for boundary pixels and/or boundary frames. For example, in some embodiments, a video sprite sheet can include an array of video sprites in the same temporal coordinates as described above in connection with FIG. 2. Continuing this example, the video sprites in the array can be separated by any suitable borders, such as black gridlines with any suitable width (e.g., any suitable number of pixels). Then, at 110, process 100 can use any suitable image processing (e.g., edge detection) to check the identified video sprite for the presence of the gridline boundaries. Such boundary pixels and/or boundary frames can, for example, separate individual video sprites by a particular number of pixels with a border (e.g., black pixels) in between such that video sprites do not bleed into adjacent video sprites.

Process 100 can also, in some embodiments, adjust the mask and/or appearance of the video sprite sheet at 110 to inhibit any video sprite borders from appearing in the display of the video sprite. Similarly, in some embodiments, a video sprite sheet can include temporal boundary frames between video sprites. For example, in some embodiments, at the start of a video sprite, the video sprite sheet can contain a frame or series of frames that have any suitable pattern and/or pixel value (e.g., 10 frames that are all black). In this example, process 100 can, at 110, check any suitable quantity of frames at the beginning and ending of the masked and/or extracted video sprite for the presence of the temporal boundary frames, and can adjust the start time, end time, starting frame(s), and/or ending frame(s) such that the temporal boundary frames do not appear when the video sprite is displayed in the media content.

In some embodiments, process 100 can determine at 110 that the size of the video sprite does not match the size of the reference for displaying the video sprite. In some embodiments, process 100 can re-size the video sprite to fit the spatial extent of the reference to the video sprite. For example, in some embodiments, process 100 can magnify and/or de-magnify the video sprite. In this example, in some embodiments, process 100 can concurrently perform any suitable up-sampling or down-sampling such that the final size of the video sprite has a resolution that matches (or nearly matches) the current resolution of the media content where the video sprite is to be displayed. In some embodiments, process 100 can request a different video sprite with the same imagery and/or visual content but which has the appropriate scaling and/or spatial resolution to match the current resolution of the media content.

In some embodiments, at 110, process 100 can identify the frame rate of the video sprite and can adjust the video sprite to have the frame rate and/or frame display times contained in the reference received at 106. In some embodiments, process 100 can use any suitable mechanism to change the frame rate to match the frame rate of the media content and/or values contained in the reference received at 106.

In some embodiments, at 110, process 100 can determine that playback of the media content has reached a frame value and/or timestamp that corresponds to the end of the display of the video sprite. In some embodiments, process 100 can end the display of the video sprite at 110.

In some embodiments, at 112, process 100 can loop back to 106. For example, in some embodiments, process 100 can receive a second reference to a video sprite within the same media content streaming session. In some embodiments, the second reference to a video sprite can be an updated reference to a previous reference for a given video sprite.

In some embodiments, when process 100 loops at 112, process 100 can continue advancing through playback of the media content while displaying any referenced video sprites.

In some embodiments, when process 100 arrives at block 110 after looping at 112, process 100 can present a second video sprite as referenced in a second iteration of block 106, while still continuing to present a first and/or previous video sprite as referenced in a first and/or previous iteration of block 106. In some embodiments, any suitable number of video sprites can be displayed concurrently with the media content.

In some embodiments, process 100 can loop at 112 and can perform any suitable additional tasks. For example, in some embodiments, process 100 can query the media content stream to check if the resolution and/or frame rate of the media content has changed. Continuing this example, in some embodiments, process 100 can update the video sprite as necessary to continue displaying the referenced video sprite at a resolution and/or frame rate that is consistent with the media content.

In some embodiments, process 100 can end at any suitable time. For example, in some embodiments, process 100 can end when playback of the media content reaches the end of the media content. In another example, in some embodiments, process 100 can end when the media content streaming session is ended (e.g., a user ends the streaming session, the streaming session is interrupted, etc.).

Figure 4:
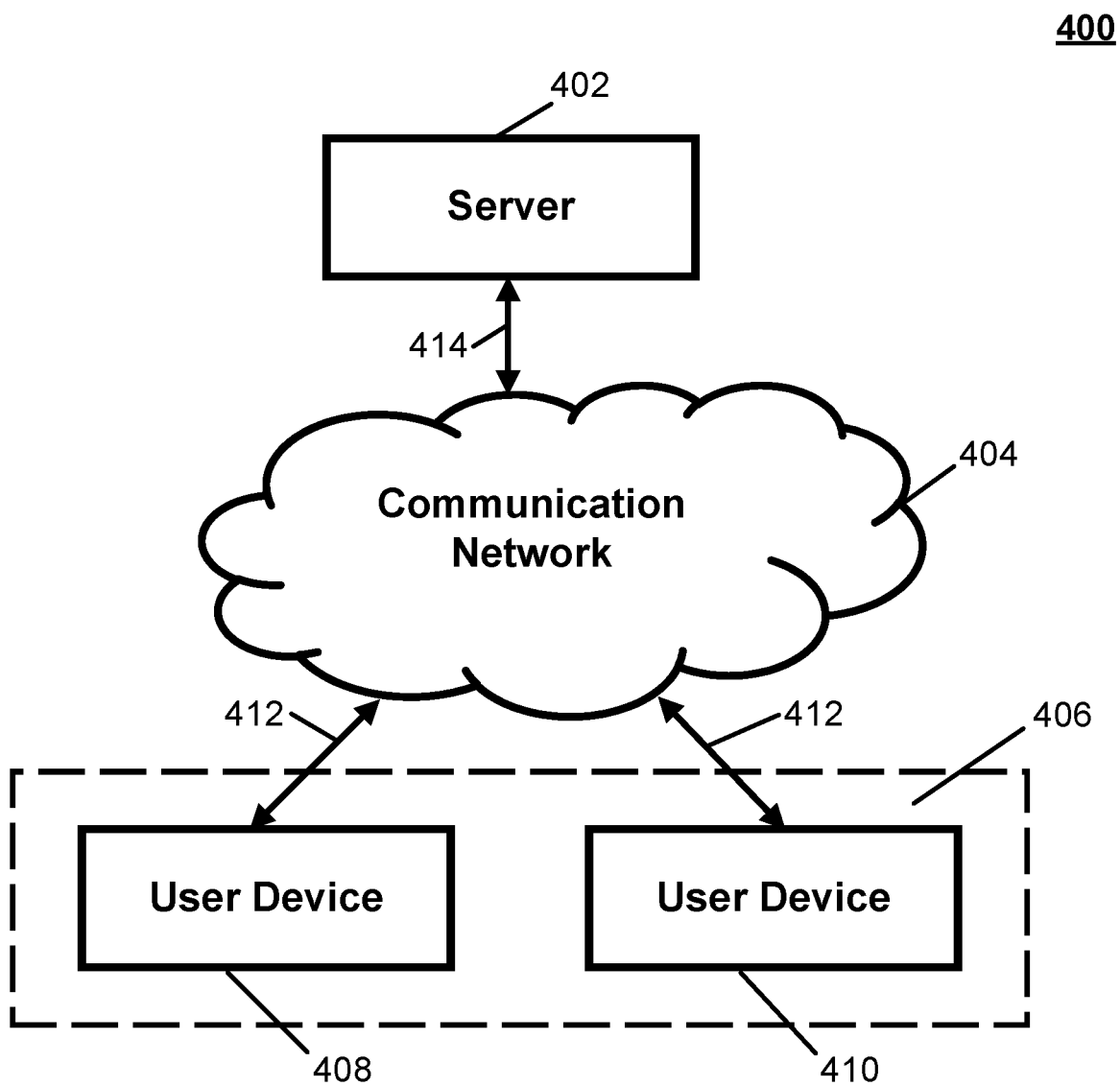
FIG. 4 shows an example block diagram of a system that can be used to implement mechanisms described herein in accordance with some embodiments of the disclosed subject matter.

Turning to FIG. 4, an example 400 of hardware for displaying streaming media content on a user device in accordance with some embodiments is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s).

Communication network 404 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with process 100. In some embodiments, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a computer program stored in memory and/or storage 504. For example, in some embodiments, the computer program can cause hardware processor 502 to perform functions described herein.

Memory and/or storage 504 can be any suitable memory and/or storage for storing programs, data, documents, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of processes 100 and 300, can be executed or performed in any order or sequence not limited to the order and sequence shown in and described in connection with FIGS. 1 and 3. Also, some of the above blocks of processes 100 and 300 can be executed or performed substantially simultaneously where appropriate or in parallel to reduce latency and processing times. Additionally or alternatively, some of the above described blocks of processes 100 and 300 can be omitted.

Accordingly, methods, systems, and media for displaying streaming media content on a user device using video sprite sheets are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
receiving, by a user device, a first request to view media content through a media content streaming session in a user interface on the user device;
responsive to receiving the first request, transmitting, by the user device and to a computing system that hosts the media content, a second request, including an indication of the media content;
receiving, by the user device and from the computing system, a response to the second request including a video sprite sheet and the media content, wherein the video sprite sheet includes a plurality of video sprites, wherein each video sprite of the plurality of video sprites is selectable for rendering in a portion of the user interface;
determining, by the user device, that the media content streaming session contains a first reference to a first video sprite from the video sprite sheet, wherein the first reference includes a location of the first video sprite within the video sprite sheet and instructions to present the first video sprite concurrently with the media content;
extracting, by the user device, the first video sprite from within the video sprite sheet based on the location of the first video sprite, wherein the location of the first video sprite comprises spatial coordinates of the first video sprite within the video sprite sheet and temporal coordinates of the first video sprite within the video sprite sheet; and
presenting, by the user device, the first video sprite at one of the portions of the user interface concurrently with the media content in the user interface.

2. The method of claim 1, further comprising storing, by the user device, the video sprite sheet on the user device.

3. The method of claim 1, wherein receiving the response from the computing system that includes the video sprite sheet and the media content further comprises receiving a first media stream containing the video sprite sheet and a second media stream containing the media content.

4. The method of claim 1, wherein the first video sprite comprises a selectable element of the user interface.

5. The method of claim 1, wherein the first media content is a video displayed in a video player of the user interface and the first video sprite comprises a layer of video to be presented concurrently with the first media content within the video player of the user interface.

6. The method of claim 1, wherein the first media content comprises a webpage and the first video sprite comprises an animated thumbnail.

7. The method of claim 1, wherein presenting the first video sprite at one of the portions of the user interface concurrently with the first media content comprises presenting, by the user device, the first video sprite at a predefined position within the user interface for a predefined duration.

8. The method of claim 1, further comprising:
determining, by the user device, that the media content streaming session contains a second reference to a second video sprite from the video sprite sheet, wherein the second reference further includes a location of the second video sprite within the video sprite sheet and instructions to present the second video sprite concurrently with at least one of the first media content and the first video sprite;
extracting, by the user device, the second video sprite from within the video sprite sheet based on the location of the second video sprite, wherein the location of the second video sprite comprises second spatial coordinates and second temporal coordinates; and
presenting, by the user device, the second video sprite concurrently with one or more at least one of the first media content or the first video sprite in the user interface.

9. A computing device comprising:
a memory; and
a hardware processor that is configured to:
receive a first request to view media content through a media content streaming session in a user interface on the computing device;
responsive to receiving the first request, transmit, to a computing system that hosts the media content, a second request, including an indication of the media content;
receive, from the computing system, a response to the second request including a video sprite sheet and the media content, wherein the video sprite sheet includes a plurality of video sprites, wherein each video sprite of the plurality of video sprites is selectable for rendering in a portion of the user interface;
determine that the media content streaming session contains a first reference to a first video sprite from the video sprite sheet, wherein the first reference includes a location of the first video sprite within the video sprite sheet and instructions to present the first video sprite concurrently with the media content;
extract the first video sprite from within the video sprite sheet based on the location of the first video sprite, wherein the location of the first video sprite comprises spatial coordinates of the first video sprite within the video sprite sheet and temporal coordinates of the first video sprite within the video sprite sheet; and
present the first video sprite at one of the portions of the user interface concurrently with the media content in the user interface.

10. The computing device of claim 9, wherein the hardware processor is configured to store the video sprite sheet on the computing device.

11. The computing device of claim 9, wherein to receive the response from the computing system that includes the video sprite sheet and the media content the hardware processor is configured to receive a first media stream containing the video sprite sheet and a second media stream containing the media content.

12. The computing device of claim 9, wherein the first video sprite comprises a selectable element of the user interface.

13. The computing device of claim 9, wherein the first media content is a video displayed in a video player of the user interface and the first video sprite comprises a layer of video to be presented concurrently with the first media content within the video player of the user interface.

14. The computing device of claim 9, wherein the first media content comprises a webpage and the first video sprite comprises an animated thumbnail.

15. The computing device of claim 9, wherein to present the first video sprite at one of the portions of the user interface concurrently with the first media content the hardware processor is configured to present the first video sprite at a predefined position within the user interface for a predefined duration.

16. The computing device of claim 9, wherein the hardware processor is further configured to:
determine that the media content streaming session contains a second reference to a second video sprite from the video sprite sheet, wherein the second reference further includes a location of the second video sprite within the video sprite sheet and instructions to present the second video sprite concurrently with at least one of the first media content and the first video sprite;
extract the second video sprite from within the video sprite sheet based on the location of the second video sprite, wherein the location of the second video sprite comprises second spatial coordinates and second temporal coordinates; and
present the second video sprite concurrently with one or more of the first media content or the first video sprite in the user interface.

17. A non-transitory computer-readable medium containing computer executable instructions that, when executed by a processor, cause the processor to:
receive a first request to view media content through a media content streaming session in a user interface on a user device;
responsive to receiving the first request, transmit to a computing system that hosts the media content, a second request, including an indication of the media content;
receive, from the computing system, a response to the second request including a video sprite sheet and the media content, wherein the video sprite sheet includes a plurality of video sprites, wherein each video sprite of the plurality of video sprites is selectable for rendering in a portion of the user interface;
determine that the media content streaming session contains a first reference to a first video sprite from the video sprite sheet, wherein the first reference includes a location of the first video sprite within the video sprite sheet and instructions to present the first video sprite concurrently with the media content;
extract the first video sprite from within the video sprite sheet based on the location of the first video sprite, wherein the location of the first video sprite comprises spatial coordinates of the first video sprite within the video sprite sheet and temporal coordinates of the first video sprite within the video sprite sheet; and present the first video sprite at one of the portions of the user interface concurrently with the media content in the user interface.

18. The non-transitory computer-readable medium of claim 17, wherein the instructions, when executed by the processor, cause the processor to store.

19. The non-transitory computer-readable medium of claim 17, wherein to receive the response from the computing system that includes the video sprite sheet and the media content the instructions, when executed by the processor, cause the processor to receive a first media stream containing the video sprite sheet and a second media stream containing the media content.

20. The non-transitory computer-readable medium of claim 17, wherein the first video sprite comprises a selectable element of the user interface.

21. The non-transitory computer-readable medium of claim 17, wherein the first media content is a video displayed in a video player of the user interface and the first video sprite comprises a layer of video to be presented concurrently with the first media content within the video player of the user interface.

22. The non-transitory computer-readable medium of claim 17, wherein the first media content comprises a webpage and the first video sprite comprises an animated thumbnail.

23. The non-transitory computer-readable medium of claim 17, wherein to present the first video sprite at one of the portions of the user interface concurrently with the first media content the instructions, when executed by the processor, cause the processor to present the first video sprite sheet at a predefined position within the user interface for a predefined a duration.

24. The non-transitory computer-readable medium of claim 17, wherein the instructions, when executed by the processor, cause the processor to:

determine that the media content streaming session contains a second reference to a second video sprite from the video sprite sheet, wherein the second reference further includes a location of the second video sprite within the video sprite sheet and instructions to present the second video sprite concurrently with at least one of the first media content and the first video sprite;

extract the second video sprite from within the video sprite sheet based on the location of the second video sprite, wherein the location of the second video sprite comprises second spatial coordinates and second temporal coordinates; and present the second video sprite concurrently with one or more of the first media content or the first video sprite in the user interface.

\* \* \* \* \*